(12) United States Patent
Gordon et al.

(10) Patent No.: US 12,030,025 B2
(45) Date of Patent: Jul. 9, 2024

(54) DRINKING LID

(71) Applicant: BlendJet Inc., Benicia, CA (US)

(72) Inventors: William Faxon Gordon, Petaluma, CA (US); Ryan Michael Pamplin, San Juan, PR (US)

(73) Assignee: BlendJet Inc., Benicia, CA (US)

( * ) Notice: Subject to any disclaimer, the term of this patent is extended or adjusted under 35 U.S.C. 154(b) by 254 days.

(21) Appl. No.: 17/507,377

(22) Filed: Oct. 21, 2021

(65) Prior Publication Data

US 2023/0129354 A1 Apr. 27, 2023

(51) Int. Cl.
| | | |
|---|---|---|
| *B01F 33/501* | (2022.01) | |
| *A47G 19/22* | (2006.01) | |
| *A47J 43/046* | (2006.01) | |
| *A47J 43/07* | (2006.01) | |
| *B01F 27/808* | (2022.01) | |
| *B01F 35/45* | (2022.01) | |
| *B01F 101/14* | (2022.01) | |
| *B65D 25/56* | (2006.01) | |
| *B65D 47/26* | (2006.01) | |
| *B65D 51/24* | (2006.01) | |

(52) U.S. Cl.
CPC ...... *B01F 33/5014* (2022.01); *A47G 19/2272* (2013.01); *A47J 43/046* (2013.01); *A47J 43/0716* (2013.01); *B01F 27/808* (2022.01); *B01F 35/4521* (2022.01); *B65D 25/56* (2013.01); *B65D 47/265* (2013.01); *B65D 51/242* (2013.01); *B01F 2101/14* (2022.01)

(58) Field of Classification Search
CPC ............... B65D 47/265; B65D 51/242; B65D 2543/00046; B65D 43/18
See application file for complete search history.

(56) References Cited

U.S. PATENT DOCUMENTS

| | | | |
|---|---|---|---|
| 5,294,014 A | 3/1994 | Wyatt | |
| 5,462,185 A * | 10/1995 | Walker, III | .......... B65D 47/147 215/307 |
| 6,010,029 A | 1/2000 | Wang | |
| 6,626,314 B1 * | 9/2003 | McHenry | ............. B65D 47/265 220/255 |
| 8,529,118 B2 * | 9/2013 | Davis | .................... A47J 43/046 366/205 |

(Continued)

FOREIGN PATENT DOCUMENTS

CN 1008669963 10/2018

OTHER PUBLICATIONS

PCT International Search Report and Written Opinion, Application No. PCT/US2022/046775 dated Jan. 31, 2023 (7 pages).

*Primary Examiner* — Nathan J Jenness
*Assistant Examiner* — Jennifer Castriotta
(74) *Attorney, Agent, or Firm* — Esplin & Associates, PC

(57) ABSTRACT

A drinking lid is disclosed herein. Exemplary implementations may include a stationary portion and a spinning portion. The stationary portion includes a drinking opening. The spinning portion is rotatably coupled to the stationary portion. The spinning portion is configured to be positioned in a position in which the drinking opening is covered such that the drinking lid is spill-resistant. The spinning portion is further configured to be positioned in a different position that leaves the drinking opening uncovered or open.

15 Claims, 19 Drawing Sheets

(56) References Cited

U.S. PATENT DOCUMENTS

| | | | |
|---|---|---|---|
| 8,640,904 B2 * | 2/2014 | Steininger | B65D 47/265 |
| | | | 220/253 |
| 10,660,463 B2 | 5/2020 | Sims | |
| 2013/0056467 A1 | 3/2013 | Shepard | |
| 2017/0253389 A1 | 9/2017 | Fogarty | |
| 2021/0403207 A1 * | 12/2021 | Li | B65D 43/0229 |
| 2022/0015560 A1 * | 1/2022 | Forsyth | B65D 51/1688 |
| 2022/0348387 A1 * | 11/2022 | Ni | B65D 47/32 |

* cited by examiner

DRINKING LID

FIELD OF THE DISCLOSURE

The present disclosure relates to drinking lids for containers, in particular beverage containers.

BACKGROUND

Drinking lids are known, for different types of containers. Some drinking lids are spill-resistant.

SUMMARY

One aspect of the present disclosure relates to drinking lids. A drinking lid may include a stationary portion, a spinning portion, and/or other components. The stationary portion includes a drinking opening. The spinning portion is rotatably coupled to the stationary portion. The spinning portion is configured to be positioned in a position in which the drinking opening is covered such that the drinking lid is spill-resistant. The spinning portion is further configured to be positioned in a different position that leaves the drinking opening uncovered or open.

One aspect of the present disclosure relates to containers with drinking lids. The container is configured to contain a beverage and/or liquid. The drinking lid may include a stationary portion, a spinning portion, and/or other components. The stationary portion includes a drinking opening. The spinning portion is rotatably coupled to the stationary portion. The spinning portion is configured to be positioned in a position in which the drinking opening is covered such that the drinking lid is spill-resistant. The spinning portion is further configured to be positioned in a different position that leaves the drinking opening uncovered or open, so a user can drink from the container.

As used herein, any association (or relation, or reflection, or indication, or correspondency) involving portions, positions, plates, assemblies, rotational axes, longitudinal axes, diameters, couplings, connectors, caps, rotations, and/or another entity or object that interacts with any part of the drinking lid and/or plays a part in the operation of the drinking lid, may be a one-to-one association, a one-to-many association, a many-to-one association, and/or a many-to-many association or "N"-to-"M" association (note that "N" and "M" may be different numbers greater than 1).

As used herein, the term "effectuate" (and derivatives thereof) may include active and/or passive causation of any effect. As used herein, the term "determine" (and derivatives thereof) may include measure, calculate, compute, estimate, approximate, generate, and/or otherwise derive, and/or any combination thereof. As used herein, the term "generate" (and derivatives thereof) may include output, create, initiate, produce, make, propagate, and/or any combination thereof.

These and other features, and characteristics of the present technology, as well as the methods of operation and functions of the related components of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
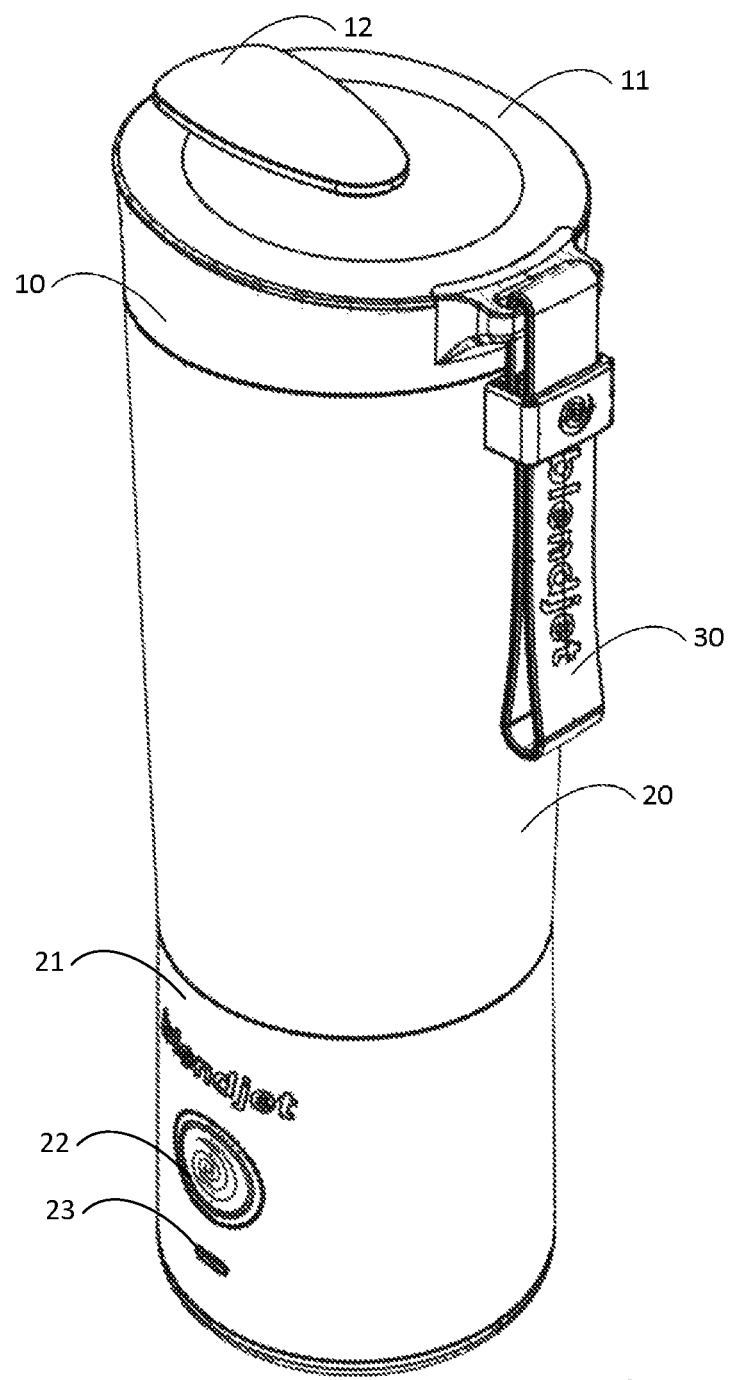
FIG. 1 shows an elevated off-center front view of a container with a drinking lid, in accordance with one or more implementations.

FIG. 1 shows a container 20 with a drinking lid 10, in accordance with one or more implementations. Container 20 is configured to contain a beverage and/or liquid. Container 20 may be a beverage container. In some implementations, container 20 may include or be a part of a portable blender (e.g., a portable blender that includes one or more of a base assembly 21, a user interface 22, a charging port 23, and/or, other components). Drinking lid 10 may include one or more of a stationary portion 11, a spinning portion 12, a carrying strap 30, and/or other components. Drinking lid 10 has a top side and a bottom side. As depicted in FIG. 1, the bottom side of drinking lid 10 is coupled to container 20, and the top side is opposite the bottom side. As shown here, (at least part of) spinning portion 12 may be disposed at the top side of drinking lid 10.

Stationary portion 11 may be configured to be removably coupled to container 20. In some implementations, stationary portion 11 may be removably coupled to container 20 via one or more mechanical couplings. In some implementations, the one or more mechanical couplings may include one or more threaded couplings (e.g., a female threaded coupling or a male threaded coupling). The one or more mechanical couplings may be configured to enable a user to manually couple and uncouple stationary portion 11 from container 20. Stationary portion 11 may be configured to remain stationary in relation to container 20 upon coupling between stationary portion 11 and container 20, at least until uncoupled by the user. For example, the user may screw, tighten, and/or otherwise couple stationary portion 11 to container 20 (e.g., through one or more mechanical couplings) such that drinking lid 10 remains fixed and/or otherwise stationary in relation to container 20 during (at least some) use. By way of non-limiting example, the user may repeatedly uncouple stationary portion 11 from container 20, (clean and) fill container 20 with a beverage and/or liquid, couple stationary portion 11 to container 20, and use container 20 and drinking lid 10 (e.g., to drink the beverage).

Figure 8:
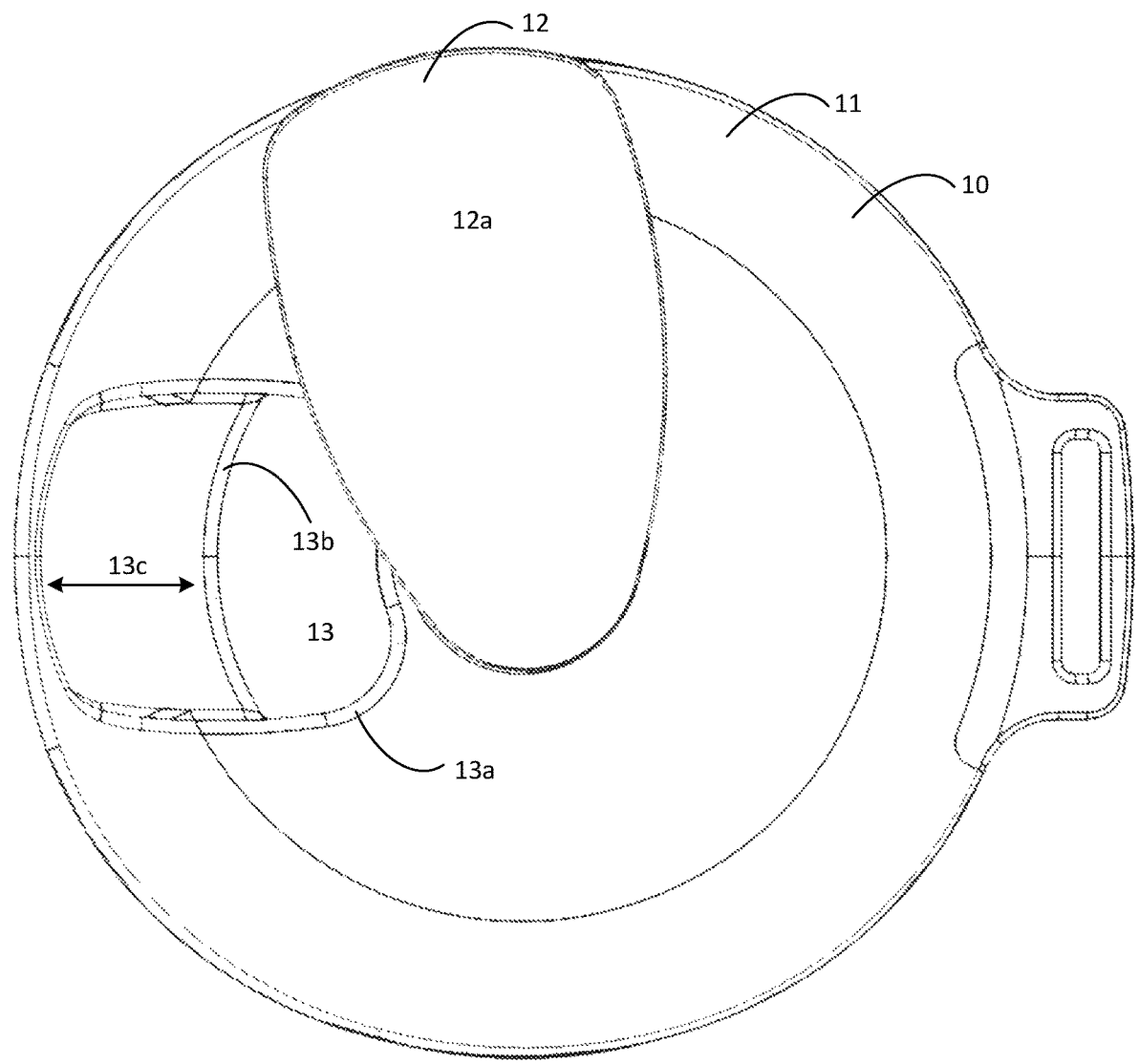
FIG. 8 shows a top view of a drinking lid, in accordance with one or more implementations.
Figure 18:
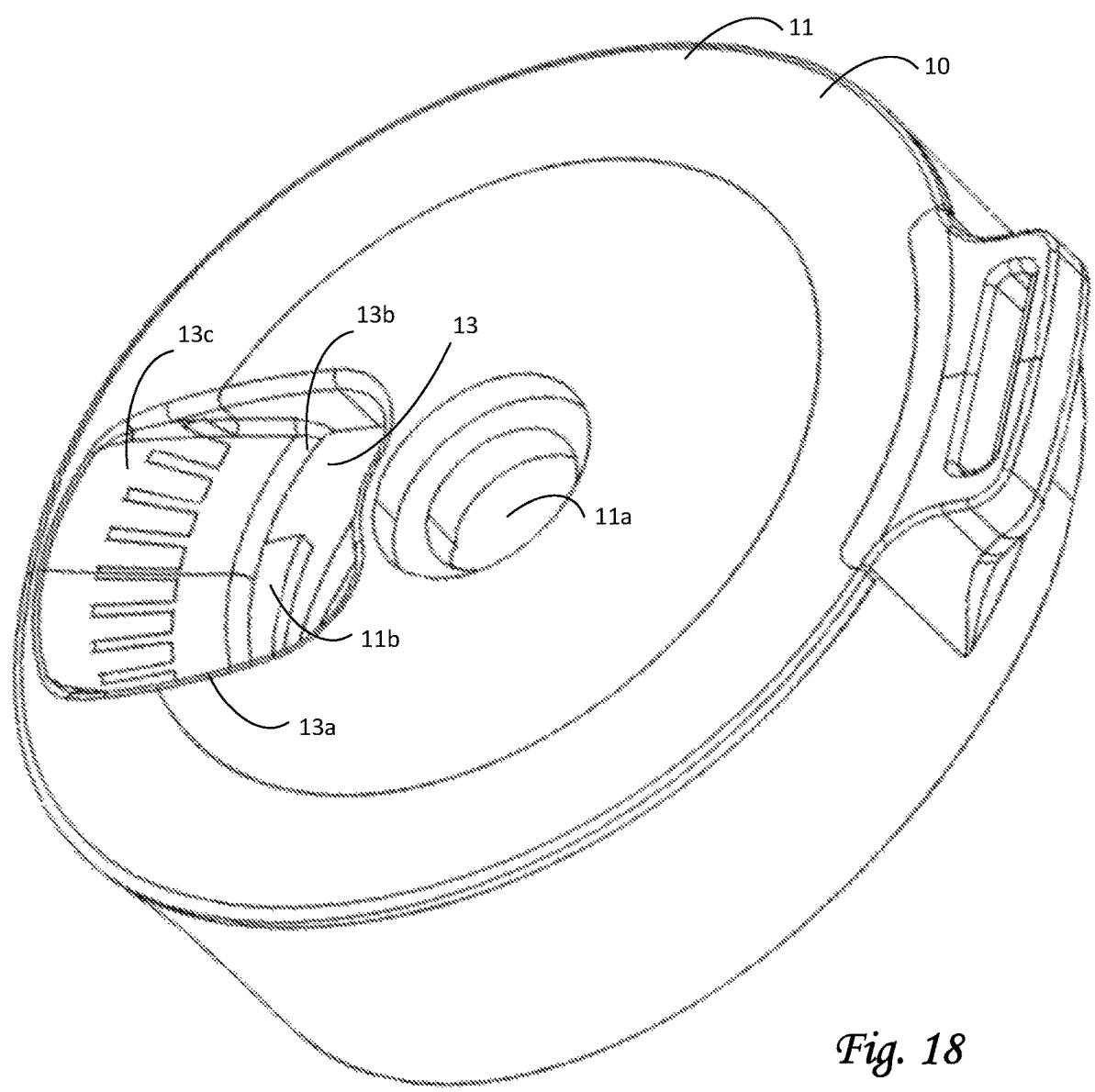
FIG. 18 and FIG. 19 show isometric views of a stationary portion of a drinking lid, in accordance with one or more implementations.

Stationary portion 11 of drinking lid 10 may include a drinking opening 13 as shown, for example in FIG. 8 and FIG. 18. Drinking opening 13 may be configured to provide a conduit, a fluid path, a fluid intermediary, and/or a flow path through stationary portion 11, from the bottom side of drinking lid 10 to (and past) the top side of drinking lid 10. For example, the user's beverage may flow through drinking opening 13 when the user is drinking the beverage. In some implementations, as shown in for example FIG. 8 and FIG. 18 and FIG. 19, drinking opening 13 may have a bottom opening shape 13b at the bottom side of drinking lid 10 and a top opening shape 13a at the top side of drinking lid 10. In some implementations, bottom opening shape 13b may be a different shape than top opening shape 13a. In some implementations, bottom opening shape 13b may be smaller than top opening shape 13a. In some implementations, top opening shape 13a may extend to the periphery of stationary portion 11.

In some implementations, as shown in for example FIG. 8 and FIG. 18, drinking opening 13 may include a connective slope 13c (or a ramp) that connects top opening shape 13a and bottom opening shape 13b. In some implementations, as shown in for example FIG. 19, drinking opening 13 may include a seal 13d (e.g., a sealing O-ring, a water-resistant seal, a waterproof seal, a gasket, gel, tape, glue, etc.) disposed around bottom opening shape 13b.

Stationary portion 11 of drinking lid 10 may include a mounting opening 11a as shown in FIG. 18. Stationary portion 11, mounting opening 11a, and/or spinning portion 12 may be configured to dispose and/or mount spinning portion 12 in mounting opening 11a in a manner such that spinning portion 12 of drinking lid 10 is rotatably coupled to stationary portion 11. In some implementations, spinning portion 12 may be permanently mounted and/or permanently integrated in mounting opening 11a. For example, spinning portion 12 and stationary portion 11 may form an integral whole. In some implementations, the phrase "integrated permanently" may refer to components being integrated such that they are not readily accessible, serviceable, and/or replaceable by a user, or at least not expected to be separated from each other during ordinary usage by the user.

In some implementations, stationary portion 11 of drinking lid 10 may include a strap connector 11c (as shown in for example FIG. 6) configured to connect to carrying strap 30. For example, carrying strap 30 may be configured to carry container 20 (by a user holding the carrying strap).

Spinning portion 12 of drinking lid 10 may be configured to be rotatably coupled to stationary portion 11, e.g., through manual manipulation of spinning portion 12 by the user. Rotation of spinning portion 12 may be relative to a rotational axis 12x, as shown in for example FIG. 7. Spinning portion 12 may be configured to be positioned in at least one of a covered position (or seated position, or closed position) and an open position (or unseated position, or uncovered position). Spinning portion 12 may be configured to transition between a covered position and an open position through rotation around rotational axis 12x. In some implementations, spinning portion 12 may transition between at least one covered position and at least one uncovered position through rotation around rotational axis 12x. In some cases, spinning portion 12 may support 360 degrees of rotation. In some cases, spinning portion 12 may support less than 360 degrees of rotation, such as, by way of non-limiting example, 270 degrees, 180 degrees, 90 degrees, and/or another rotation.

Referring to FIG. 8, drinking opening 13 (or part thereof) may be covered by spinning portion 12 (or part thereof) responsive to spinning portion 12 being positioned in the covered position. Drinking opening 13 (or part thereof) may be uncovered (or open) by spinning portion 12 (or part thereof) responsive to spinning portion 12 being positioned in the uncovered position. For example, in the covered position, drinking opening 13 may not provide a conduit and/or a flow path through stationary portion 11 (e.g., because spinning portion 12 or a part thereof blocks drinking opening 13 or a part thereof). For example, in the uncovered position, drinking opening 13 may provide a conduit and/or a flow path through stationary portion 11, between the bottom side of drinking lid 10 and the top side of drinking lid 10.

In some implementations, spinning portion 12 may include one or more of a cover plate 12a (as shown in for example FIG. 8 and FIG. 12), an assembly barrel 12b (as shown in for example FIG. 12), a sealing plate barrel connector 12c (as shown in for example FIG. 12), a sealing plate 12d (as shown in for example FIG. 12), a cover plate sealing collar 12e (as shown in for example FIG. 12), a nut 12f (as shown in for example FIG. 12), and/or other components. Typically, the components of spinning portion 12 will rotate together around rotational axis 12x, such that their positions relative to other components of spinning portion 12 remain the same during the rotation. In some implementations, one or more components included in spinning portion 12 may be joined, combined, and/or otherwise integrated into a single element. By way of non-limiting example, in some cases, sealing plate barrel connector 12c and sealing plate 12d may be combined to form an integral whole (or a single element serving the purpose and functionality of both components). Other combinations are envisioned and considered within the scope of this disclosure.

Cover plate 12a may be configured to cover top opening shape 13a of drinking opening 13. In some implementations, cover plate 12a may cover top opening shape 13a of drinking opening 13 responsive to spinning portion 12 being positioned in the covered position (as shown in for example FIG. 6). In some implementations, cover plate 12a may be coupled to assembly barrel 12b. In some implementations, cover plate 12a may leave top opening shape 13a of drinking opening 13 uncovered responsive to spinning portion 12 being positioned in the uncovered position (as shown in for example FIG. 8). Cover plate 12a may include, by way of non-limiting example, a top surface and a bottom surface. Responsive to spinning portion 12 being positioned in the covered position, the bottom surface of cover plate 12a may make contact and/or otherwise engage the top surface (of the periphery) of drinking opening 13.

In some implementations, spinning portion 12 may include cover plate 12a, but no sealing plate 12d. In some cases, such an implementation of spinning potion 12 may be configured to hold cover plate 12a in place using assembly barrel 12b and, in some implementations, nut 12f. In other cases, such an implementation of spinning potion 12 may be configured to hold cover plate 12a in place using a magnet 12z (as shown in for example FIG. 7 using dotted lines as magnet 12z may be embedded within drinking lid 10 and not readily visible from the side view in FIG. 7), e.g., without using assembly barrel 12b and, in some implementations, nut 12f. In yet other cases, spinning portion 12 may include both cover plate 12a and sealing plate 12d, but no assembly barrel 12b, as such an implementation of spinning portion 12 may be configured to hold both cover plate 12a and sealing plate 12d in place using magnet 12z (or, one or more magnets including magnet 12z).

Figure 11:
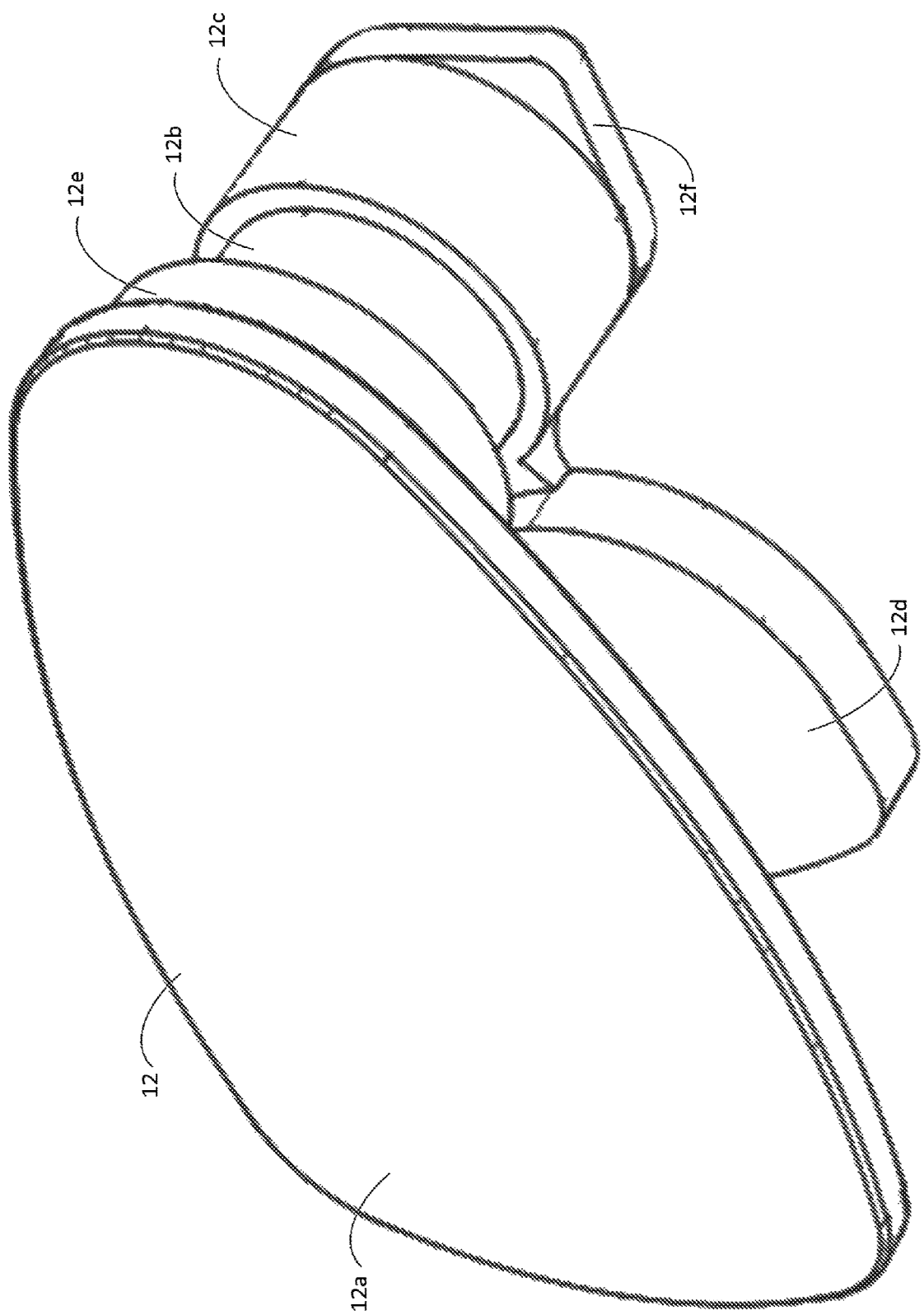
FIG. 11 and FIG. 12 show elevated views of a spinning portion of a drinking lid, in accordance with one or more implementations.
Figure 12:
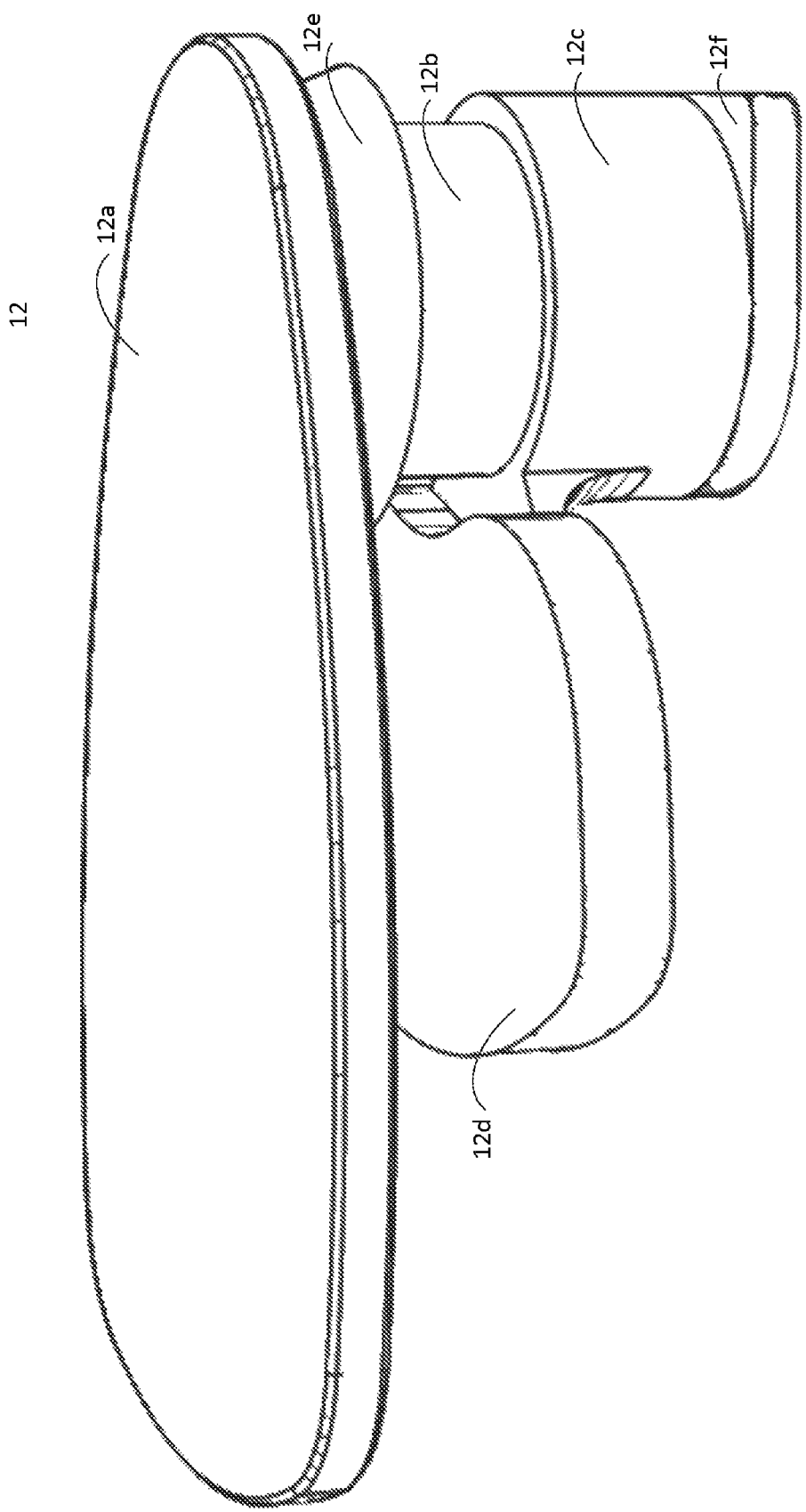
Figure 13:
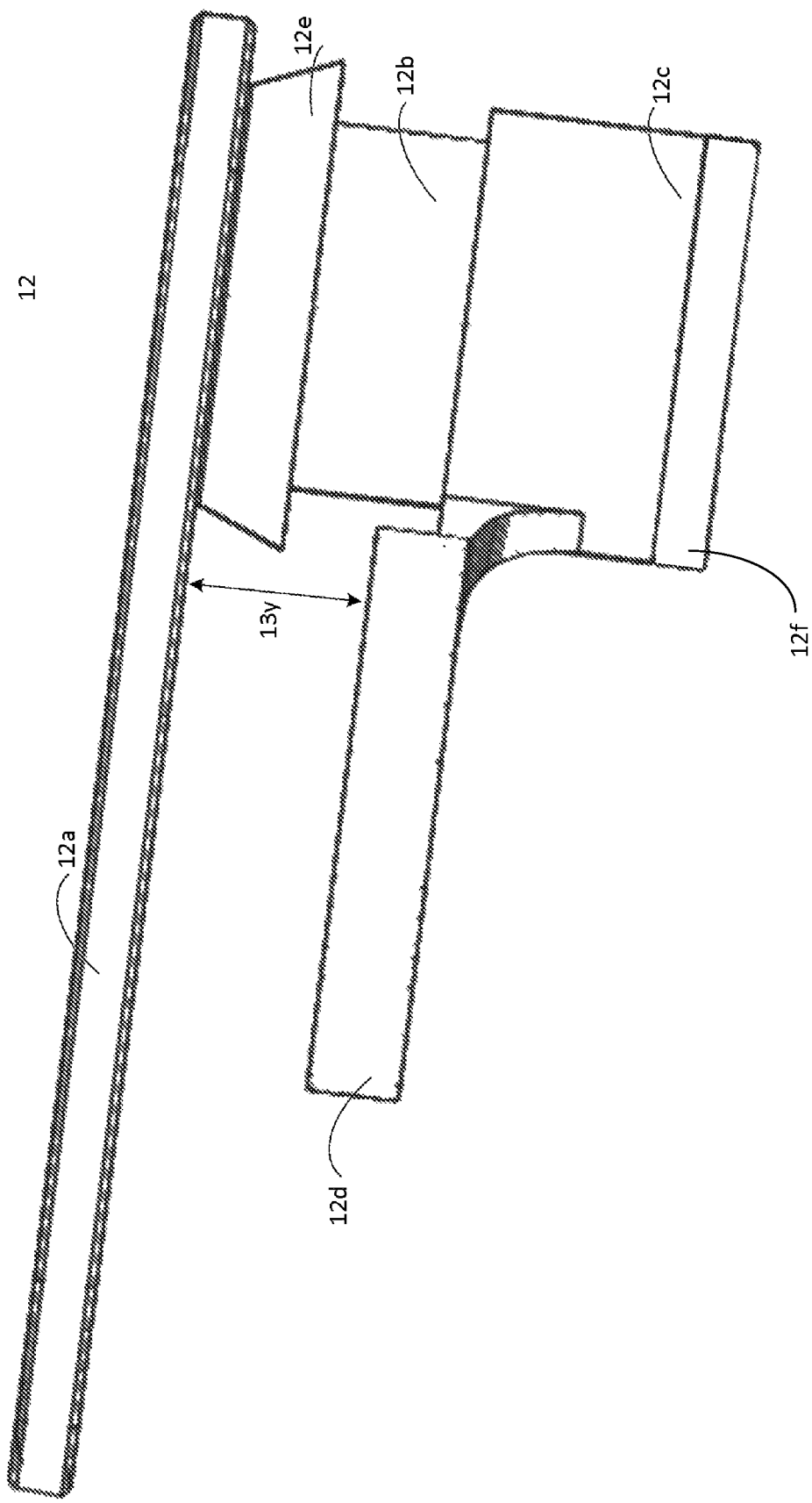
FIG. 13 shows a side view of a spinning portion of a drinking lid, in accordance with one or more implementations.

Referring to FIGS. 11-12-13, assembly barrel 12b may be configured to couple to cover plate 12a. In some implementations, assembly barrel 12b may have a cylindrical shape. In some implementations, assembly barrel 12b may have a longitudinal axis that coincides, corresponds, and/or intersects with rotational axis 12x of spinning portion 12. In some implementations, assembly barrel 12b may be hollow. Assembly barrel 12b may be configured to couple to sealing plate barrel connector 12c. In some implementations, assembly barrel 12b has a proximal end at or near cover plate 12a and a distal end opposite the proximal end. In some implementations, spinning portion 12 includes nut 12f disposed at the distal end of assembly barrel 12b.

Sealing plate barrel connector 12c may be configured to be coupled to assembly barrel 12b. In some implementations, sealing plate barrel connector 12c may be disposed around assembly barrel 12b. Sealing plate barrel connector 12c may be configured to be coupled to sealing plate 12d. In some implementations, sealing plate barrel connector 12c may be combined with sealing plate 12d into a single element (e.g., "sealing-plate-and-connector").

Sealing plate 12d may be configured to seal and/or otherwise cover bottom opening shape 13b of drinking opening 13. In some implementations, sealing plate 12d may seal and/or otherwise cover bottom opening shape 13b of drinking opening 13 such that drinking lid 10 is spill-resistant. Sealing plate 12d may cover bottom opening shape 13b responsive to spinning portion 12 being positioned in the covered position. Sealing plate 12d may leave bottom opening shape 13b uncovered responsive to spinning portion 12 being positioned in the uncovered position (as shown in for example FIG. 8). In some implementations, responsive to sealing plate 12d leaving bottom opening shape 13b uncovered, drinking opening 13 provides a conduit and/or a flow path through stationary portion 11. In some implementations, sealing plate 12d may be configured to move from an uncovered position to a covered position in such a way that sealing plate 12d cleans bottom opening shape 13b.

Cover plate sealing collar 12e may be configured to seal spinning portion 12 to stationary portion 11 in the covered position. Cover plate sealing collar 12e may be configured to couple to assembly barrel 12b. In some implementations, cover plate sealing collar 12e may be disposed between cover plate 12a and sealing plate 12d (as shown in for example FIG. 13). In some implementations, cover plate sealing collar 12e may be disposed between cover plate 12a and sealing plate barrel connector 12c. In some implementations, cover plate sealing collar 12e may be disposed around assembly barrel 12b. In some implementations, cover plate sealing collar 12e may generate upward pressure for sealing plate 12d, by virtue of having a conical and/or tapered shape that is wider at the bottom and narrower/smaller at the top.

Nut 12f may be configured to couple and/or connect one or more components of spinning portion 12 to assembly barrel 12b. Nut 12f may be disposed at the distal end of assembly barrel 12b. In some implementations, nut 12f may be a thumb nut. In some implementations, nut 12f may be a cap nut. In some implementations, nut 12f may be coupled via one or more threaded couplings, e.g., to sealing plate barrel connector 12c or to barrel assembly 12b.

Figure 10:
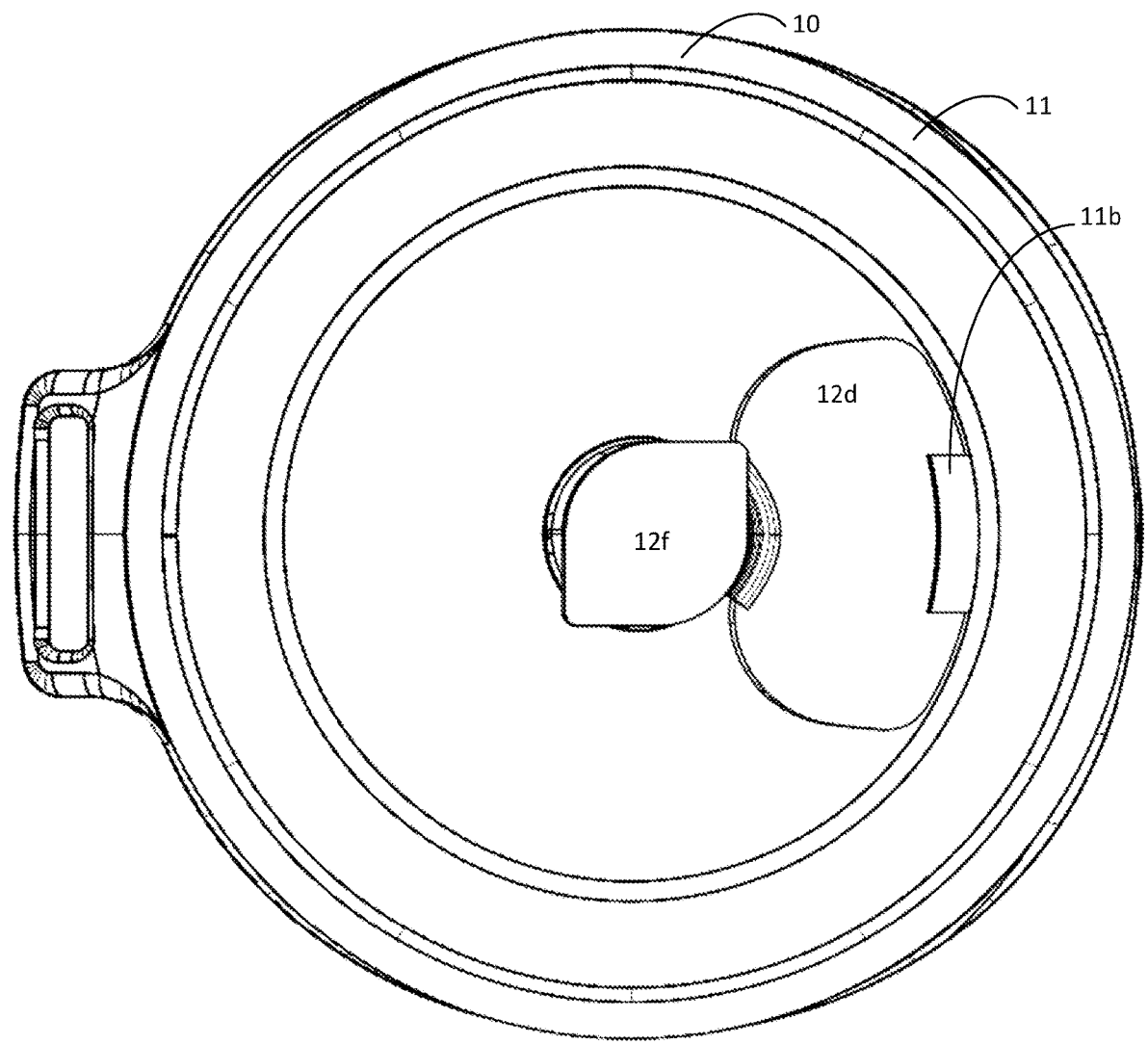
FIG. 10 shows a bottom view of a drinking lid, in accordance with one or more implementations.
Figure 19:
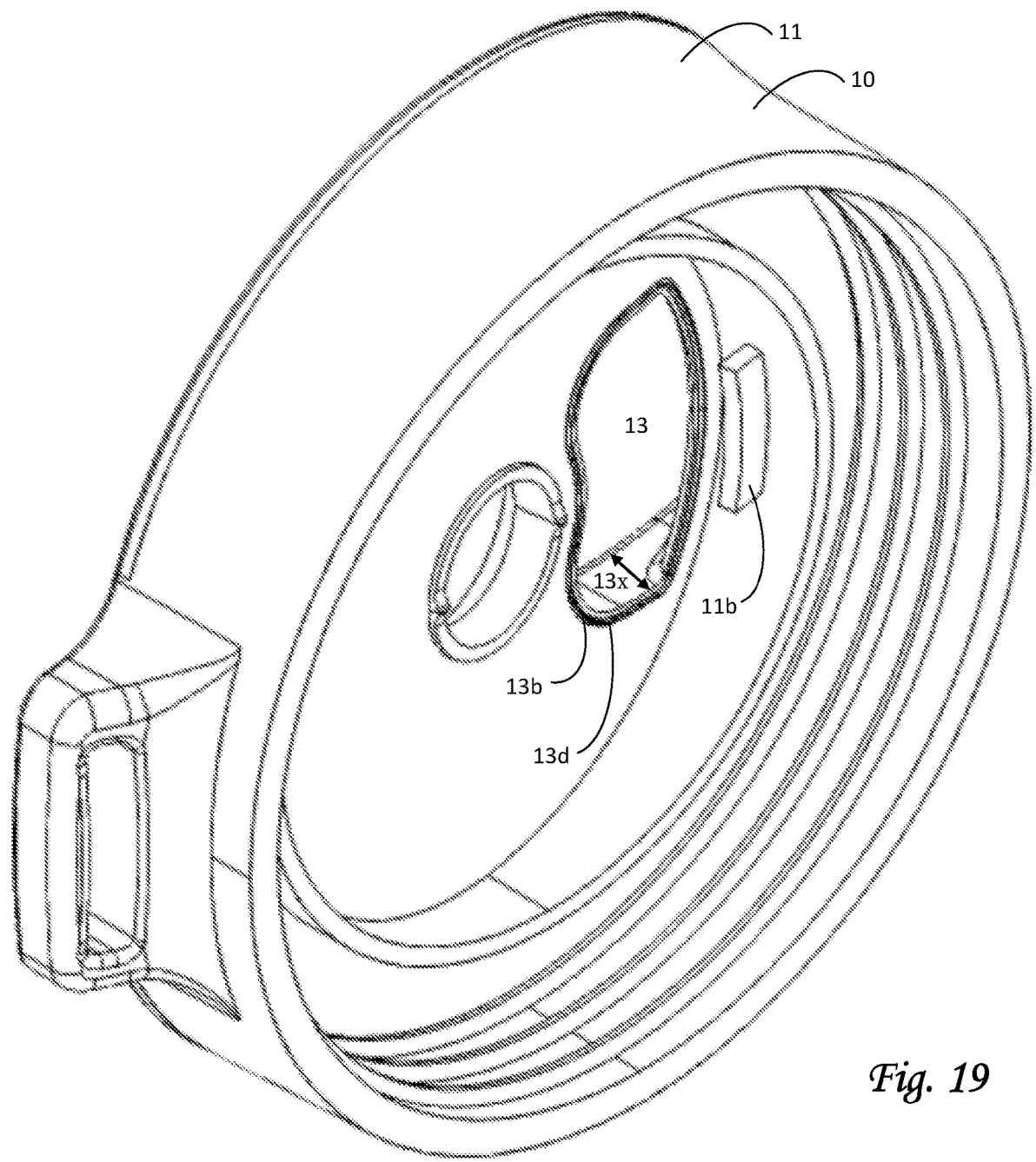

In some implementations, stationary portion 11 may include a stationary plate 11b (as shown in for example FIG. 10, FIG. 18, and FIG. 19). Stationary plate 11b may be configured to push sealing plate 12d against seal 13d around bottom opening shape 13b of drinking opening 13 responsive to spinning portion 12 being positioned in the covered position.

In some implementations, cover plate 12a has a bottom surface. In some implementations, sealing plate 12d has a top surface. In some implementations, drinking opening 13 has an opening thickness 13x (as shown in for example FIG. 19) between top opening shape 13a and bottom opening shape 13b, and wherein opening thickness 13x corresponds to a distance 13y (as shown in for example FIG. 13) between the bottom surface of cover plate 12a and the top surface of sealing plate 12d.

Figure 2:
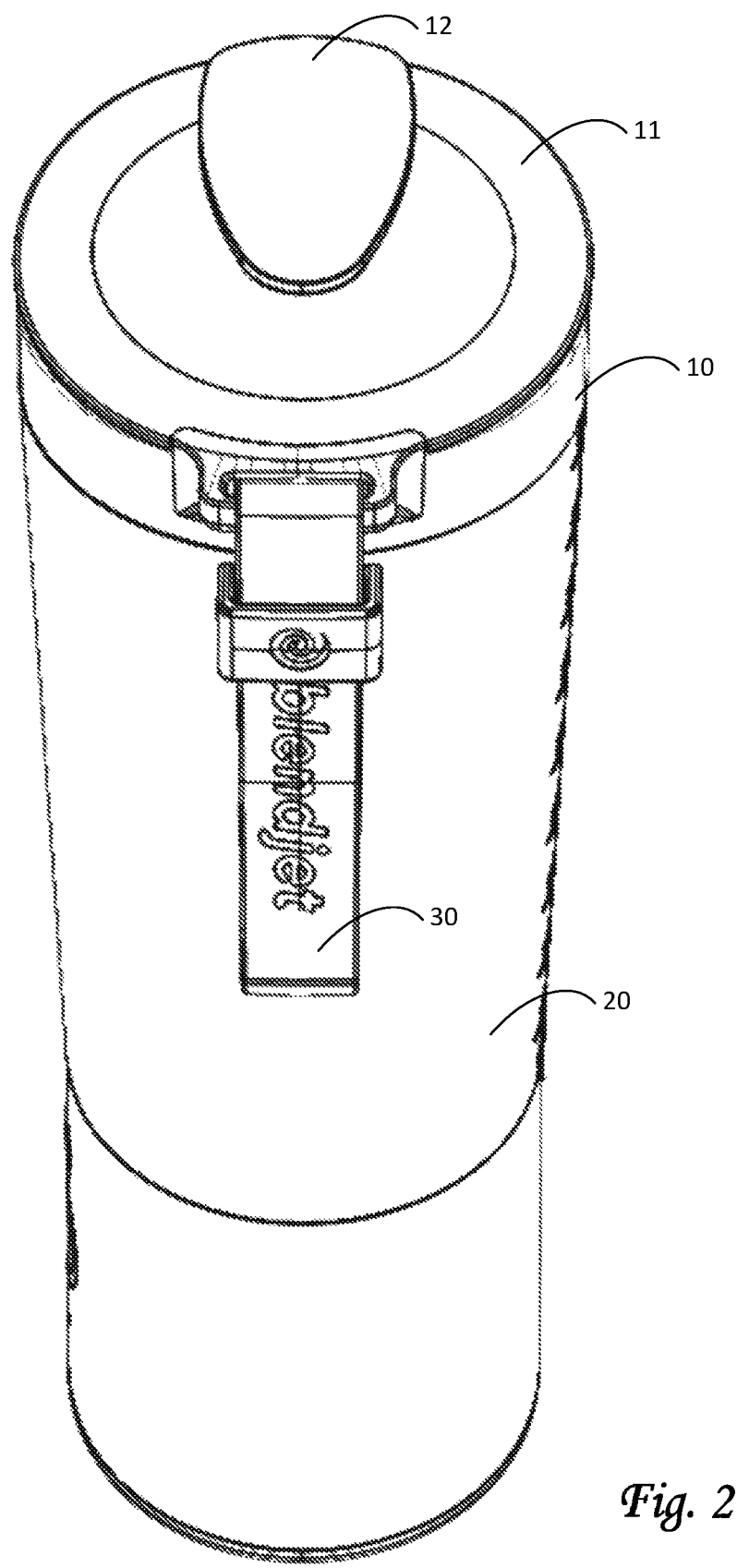
FIG. 2 shows an elevated side view of a container with a drinking lid, in accordance with one or more implementations.
Figure 3:
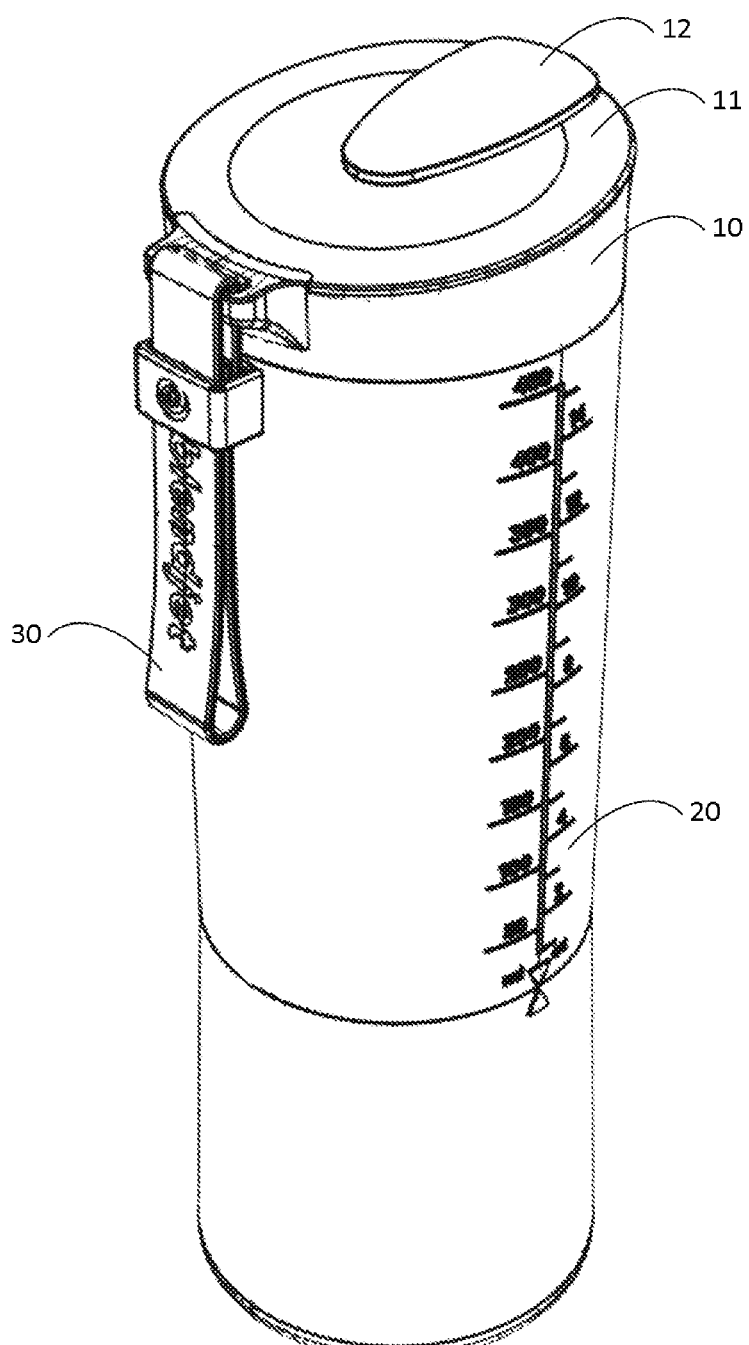
FIG. 3 shows an elevated off-center rear view of a container with a drinking lid, in accordance with one or more implementations.
Figure 4:
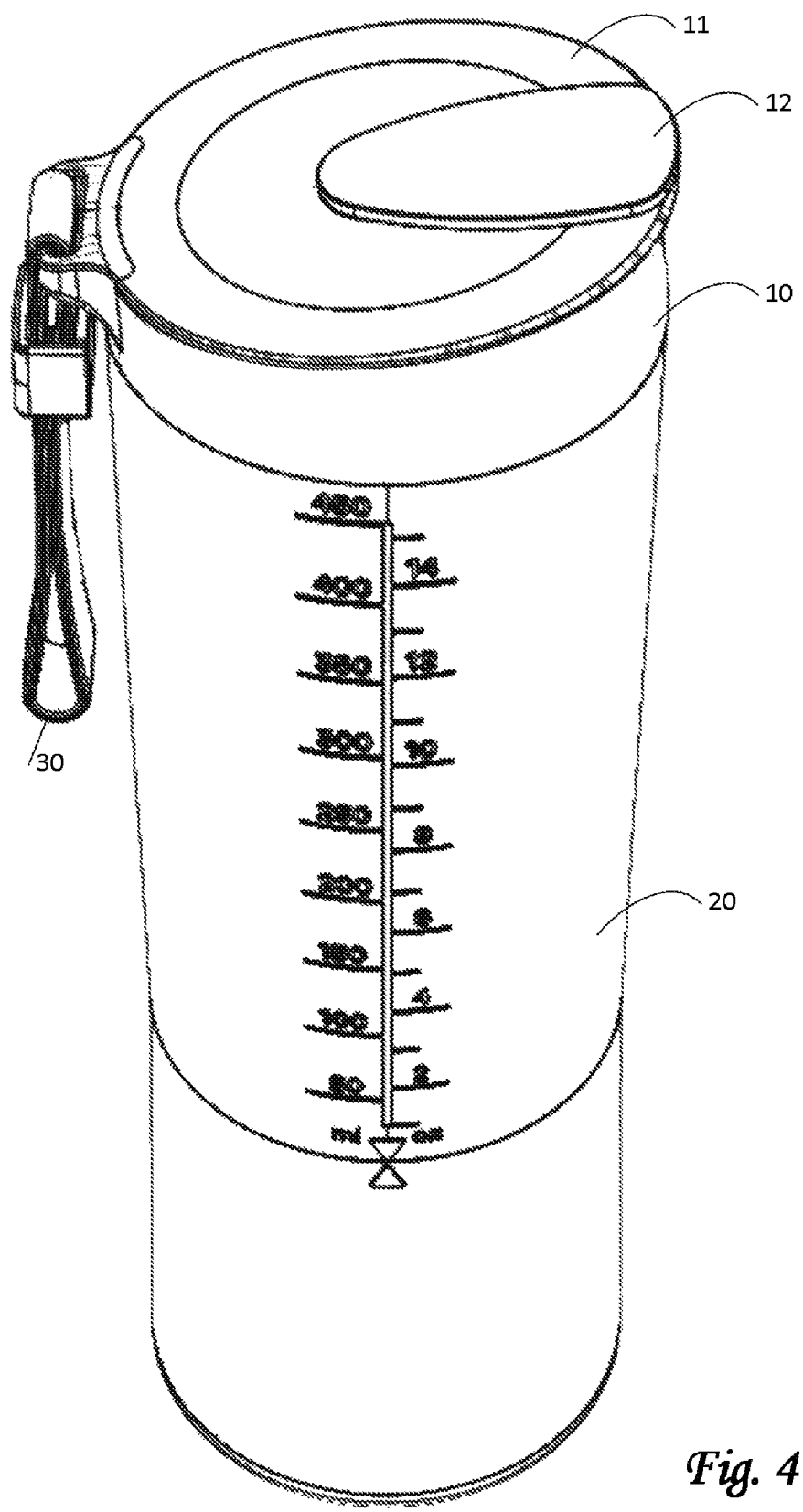
FIG. 4 shows an elevated off-center rear view of a container with a drinking lid, in accordance with one or more implementations.
Figure 5:
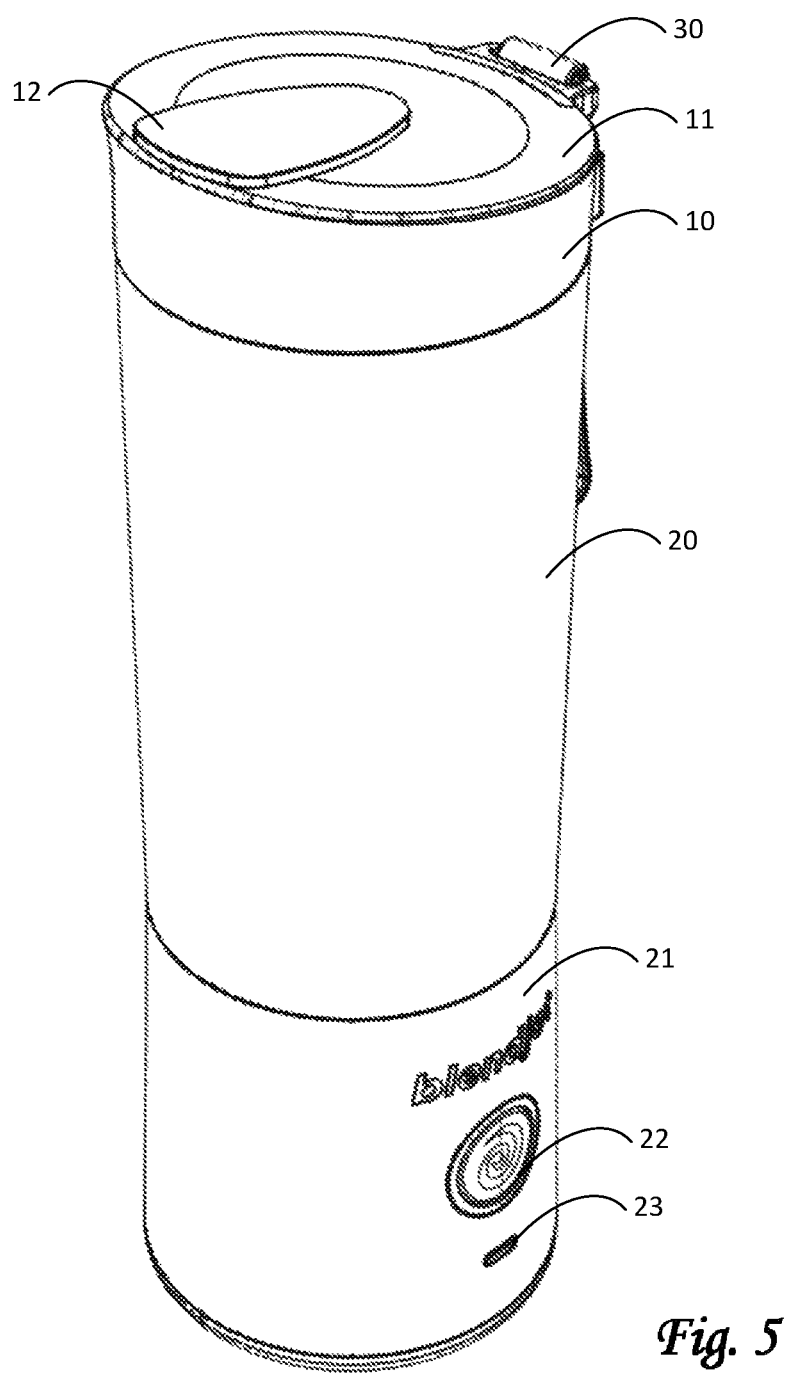
FIG. 5 shows an elevated off-center front view of a container with a drinking lid, in accordance with one or more implementations.

In some implementations, container 20 may be part of a portable blender (as shown in for example FIG. 1, FIG. 2, FIG. 3, FIG. 4, and FIG. 5). FIG. 1 shows an elevated off-center front view of container 20 (here, a portable blender, with user interface 22 in the front) with drinking lid 10. By way of non-limiting example, this portable blender as depicted may include a base assembly 21 (e.g., configured to carry one or more blades, an electric motor, and/or other components), a user interface 22 (e.g., a power button), a charging port 23, and/or other components. FIG. 5 shows a different view of an elevated off-center front view of container 20 (here, a portable blender) with drinking lid 10. FIG. 2 shows an elevated side view of container 20 with drinking lid 10. FIG. 3 shows an elevated off-center rear view of container 20 with drinking lid 10. FIG. 4 shows a different view of an elevated off-center rear view of container 20 with drinking lid 10.

Figure 6:
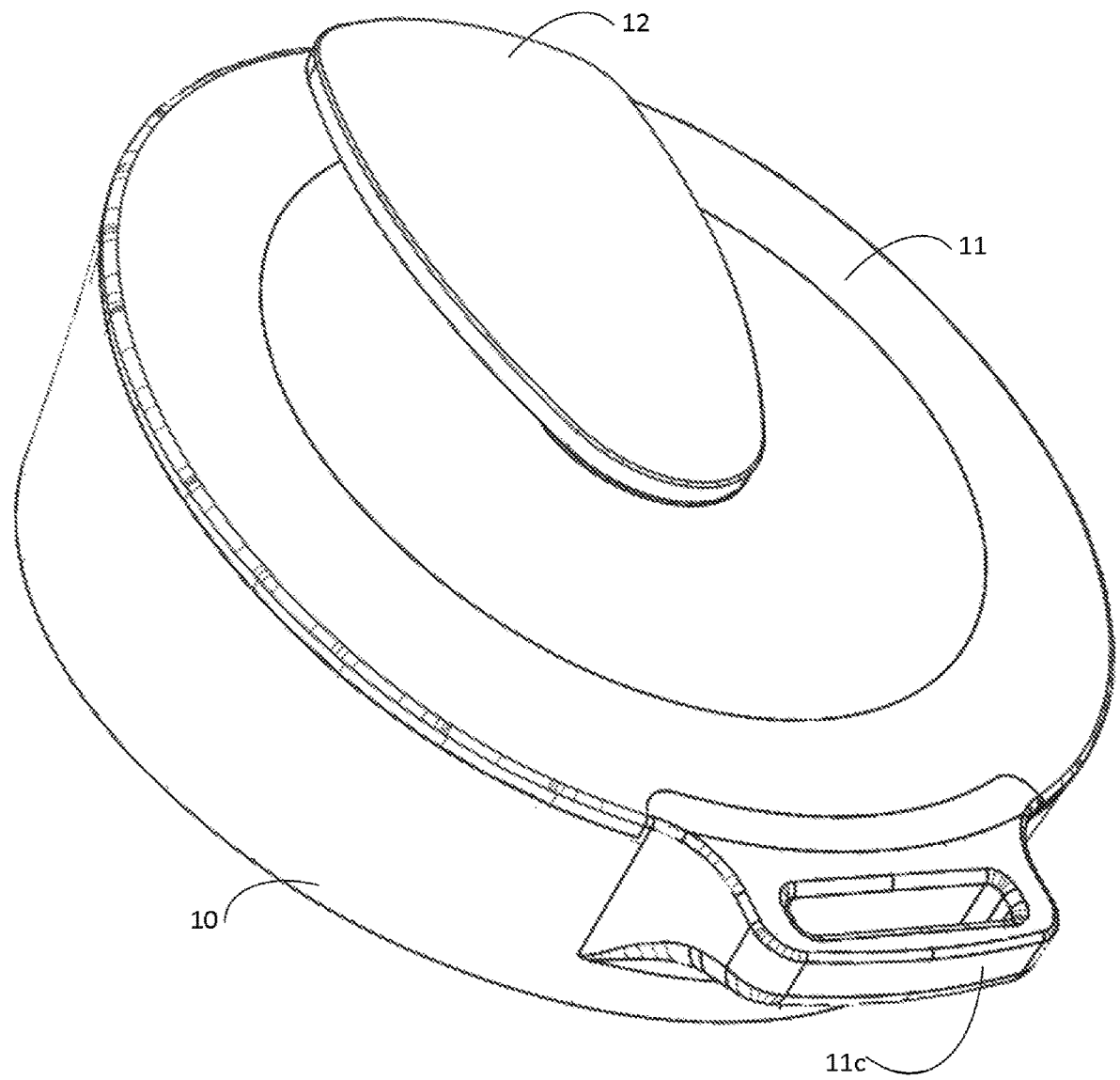
FIG. 6 and FIG. 9 show isometric views of a drinking lid, in accordance with one or more implementations.
Figure 7:
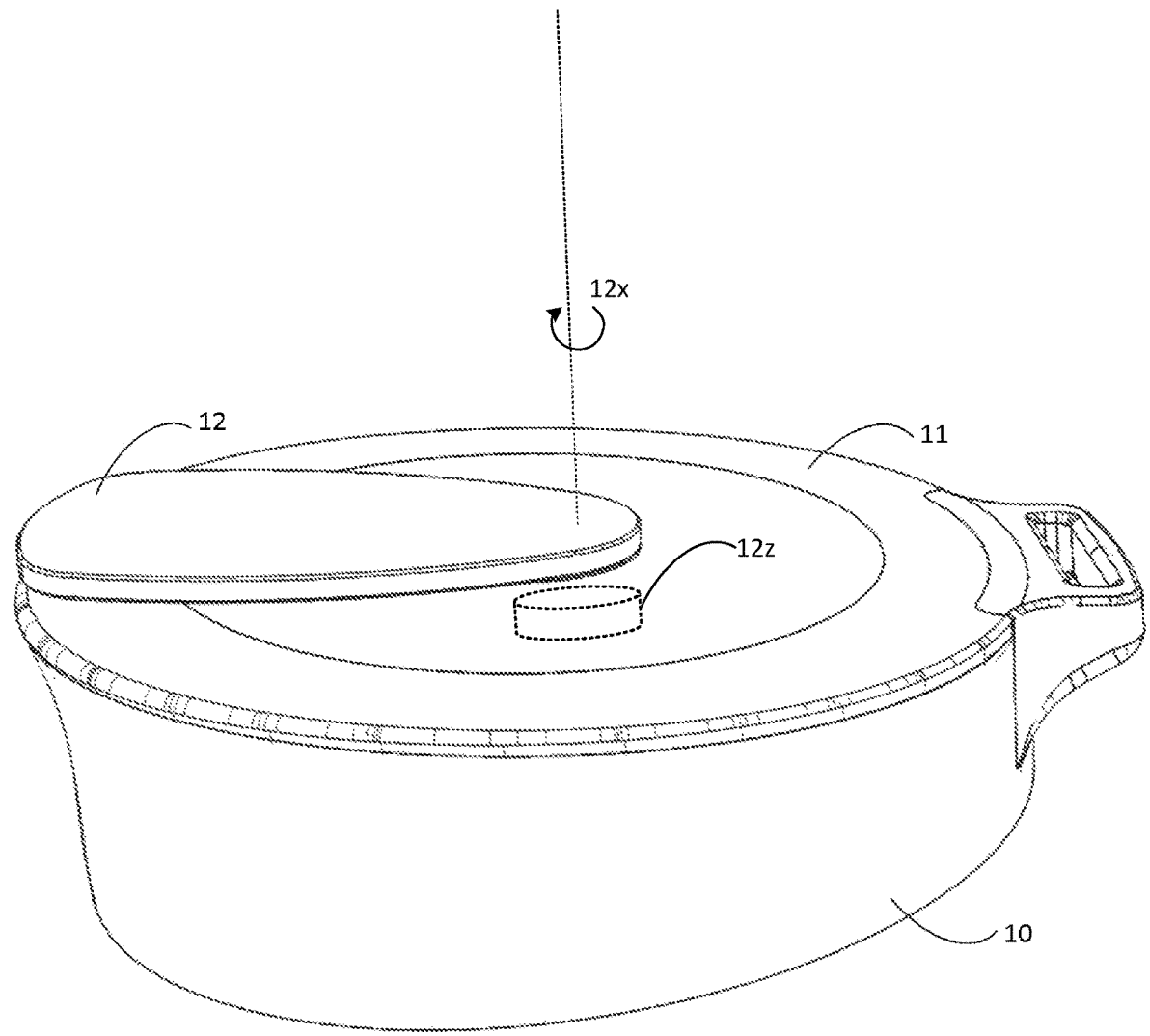
FIG. 7 shows a side view of a drinking lid, in accordance with one or more implementations.
Figure 9:
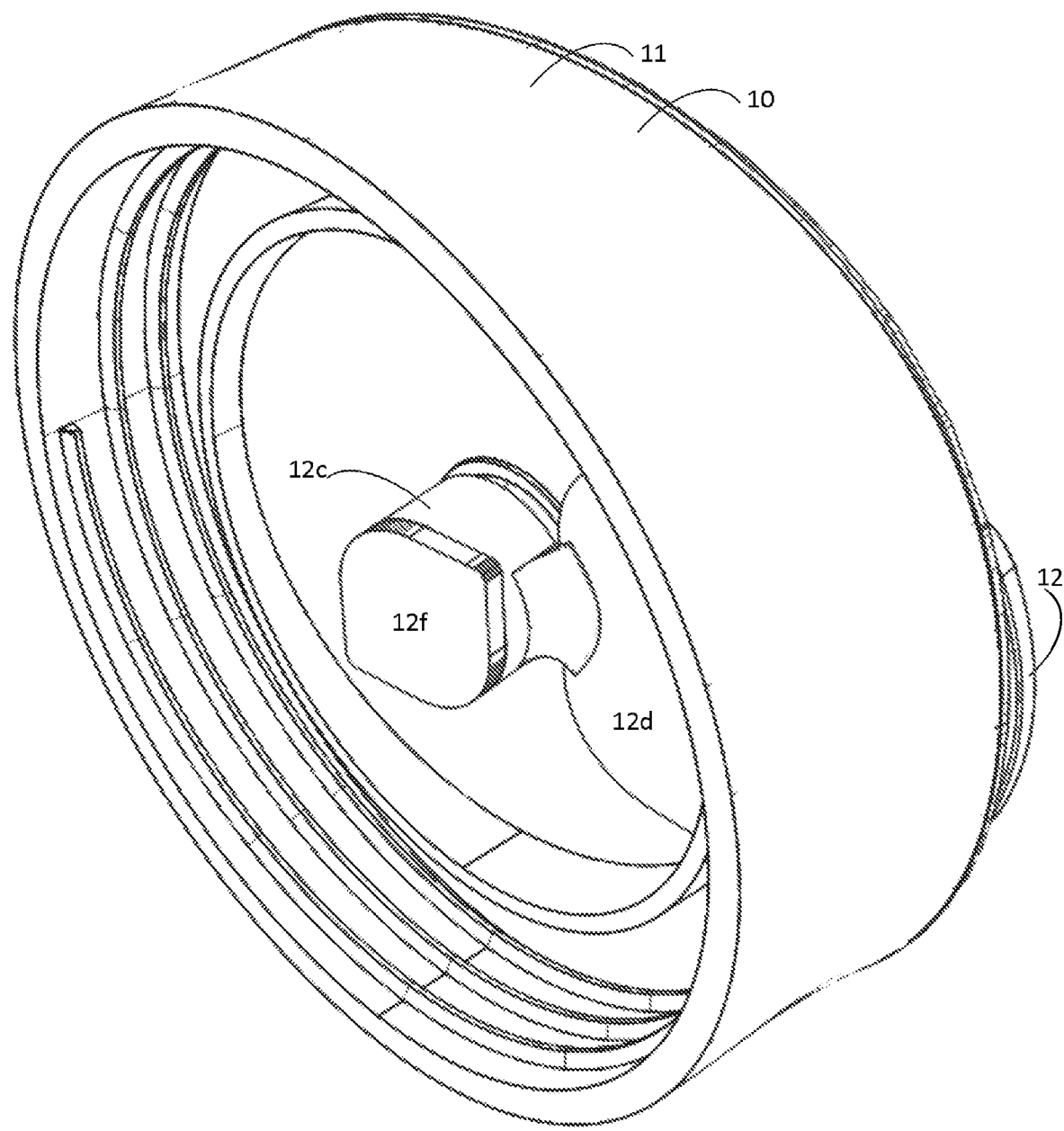
Figure 14:
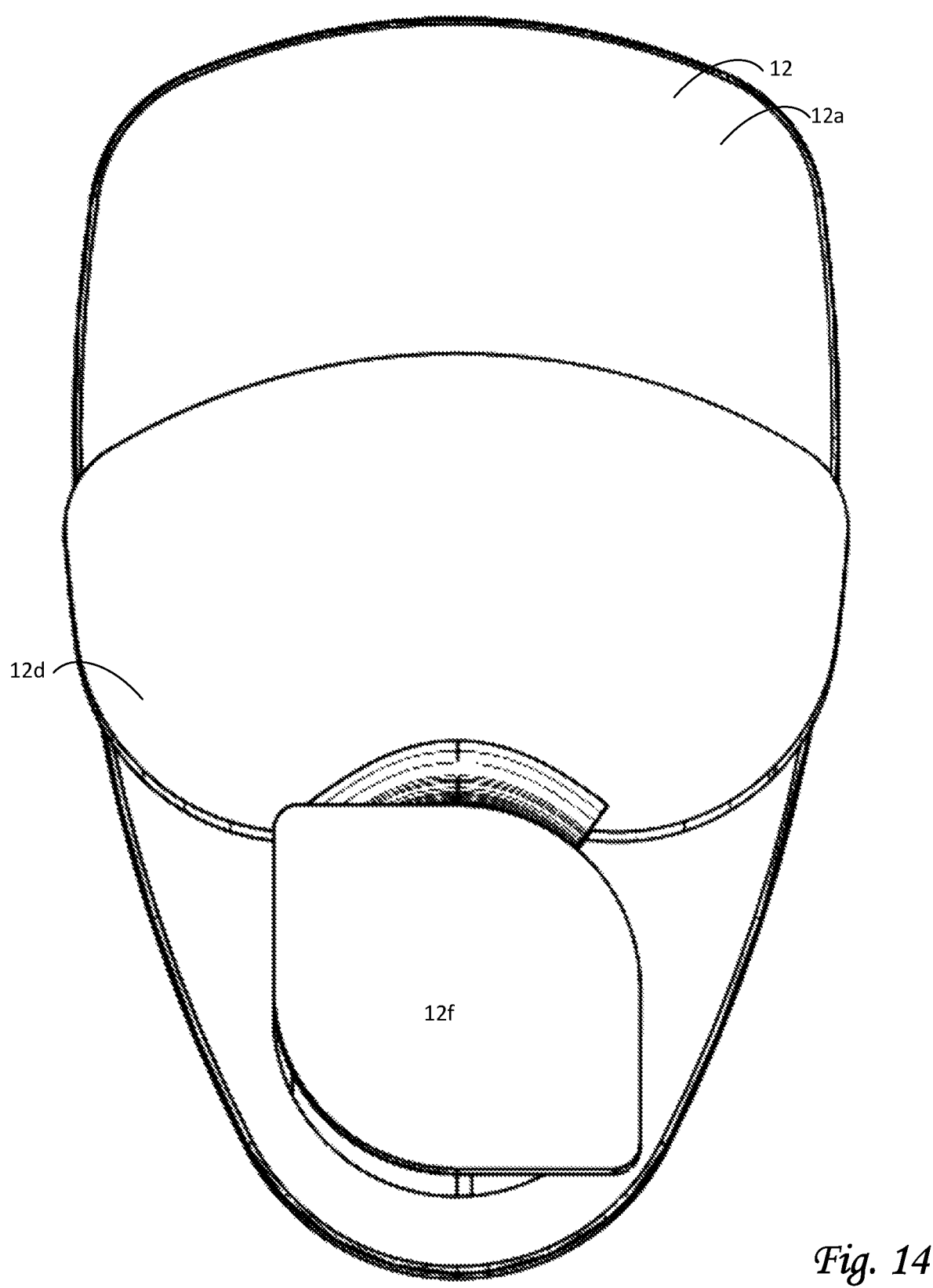
FIG. 14 shows a bottom view of a spinning portion of a drinking lid, in accordance with one or more implementations.
Figure 15:
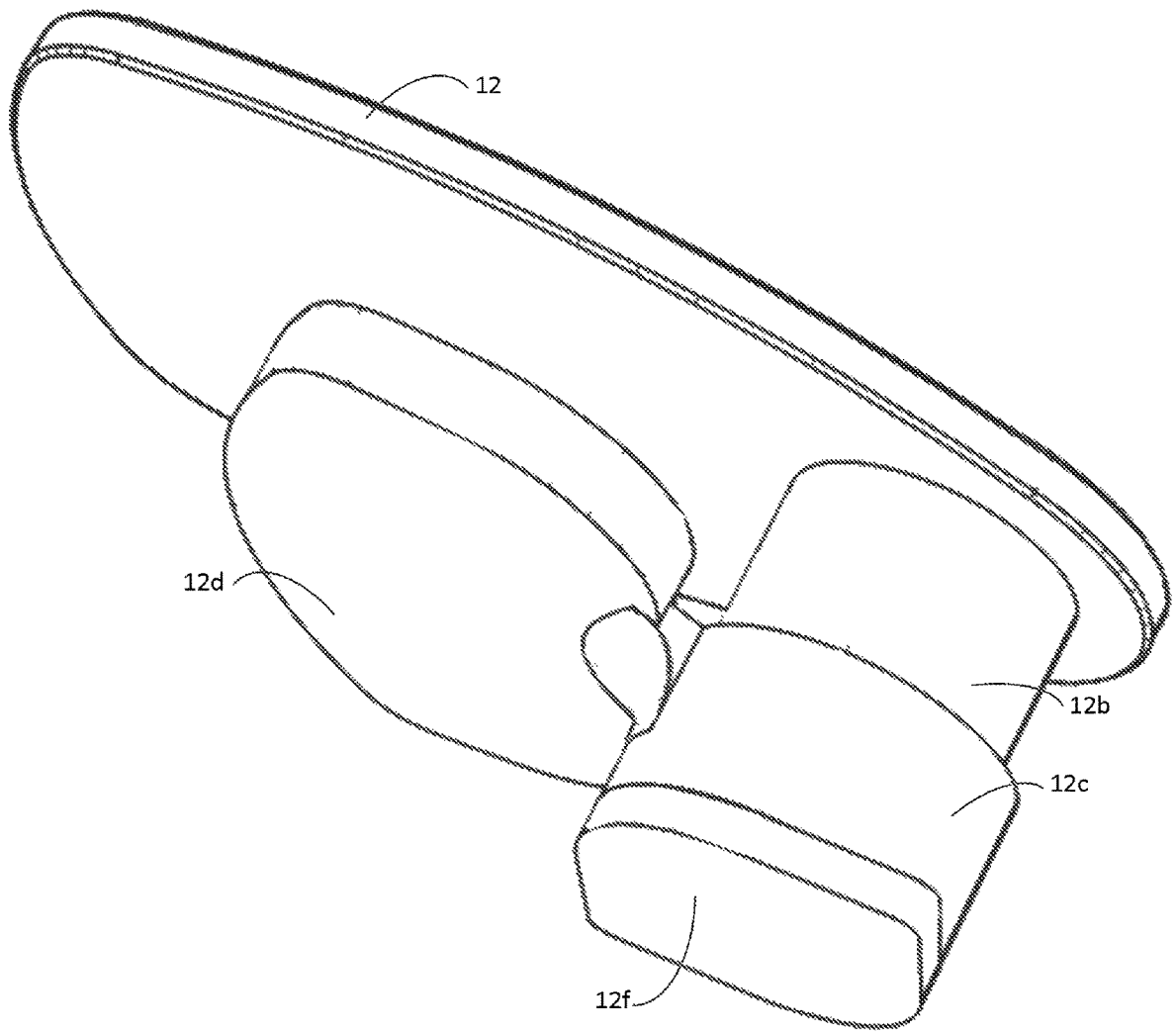
FIG. 15, FIG. 16, and FIG. 17 show isometric views of a spinning portion of a drinking lid, in accordance with one or more implementations.
Figure 16:
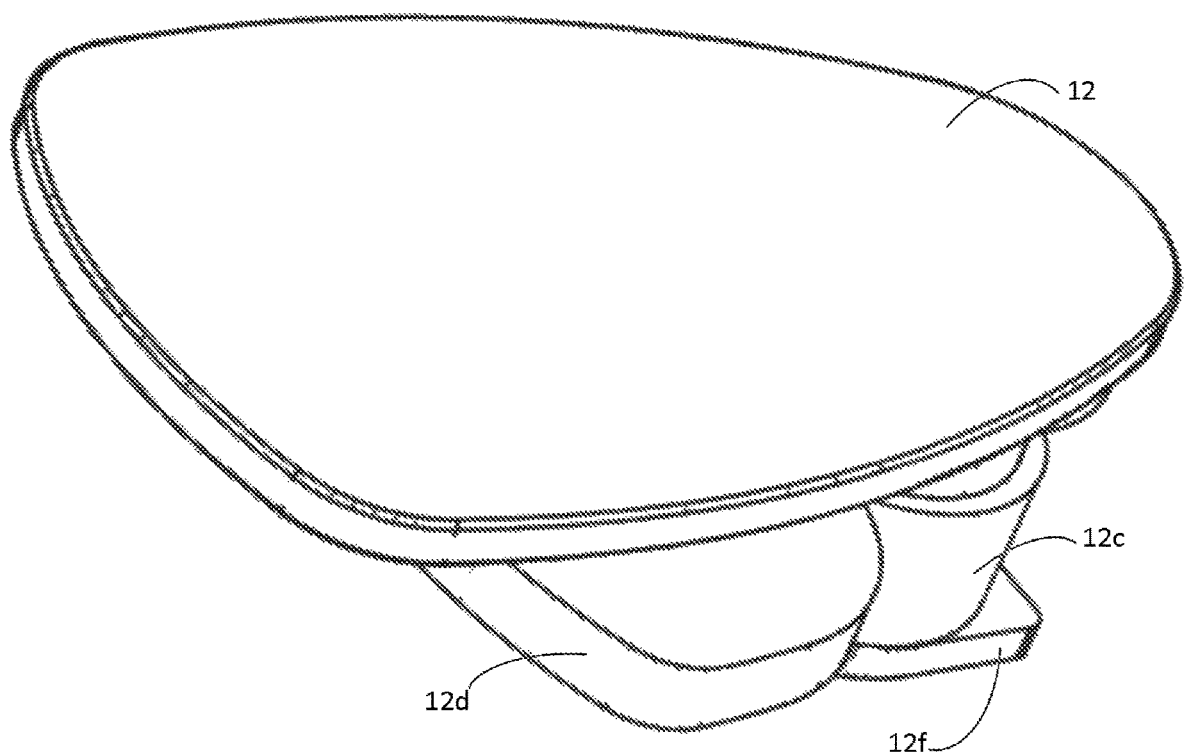
Figure 17:
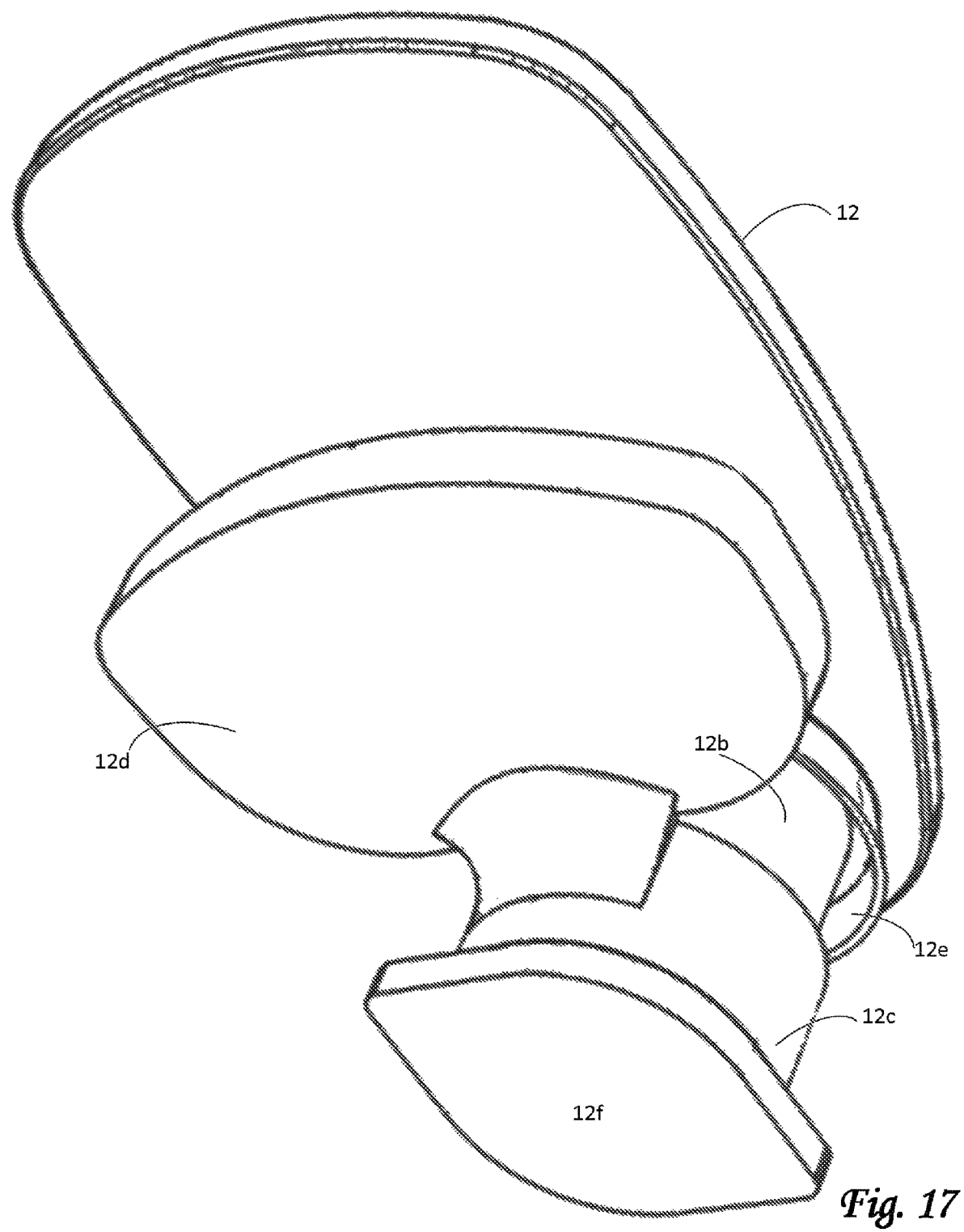

FIG. 6 and FIG. 9 show isometric views of drinking lid 10. In FIG. 6, spinning portion 12 is in the covered position, as shown from an elevated angle. In FIG. 9, stationary portion 11 is shown with a threaded coupling (to couple drinking lid 10 to container 20), from a lowered or bottom-up angle. FIG. 7 shows a side view of drinking lid 10, and illustrates rotational axis 12x. FIG. 8 shows a top view of drinking lid 10, with spinning portion 12 in an uncovered position. FIG. 10 shows a bottom view of drinking lid 10, and illustrates how stationary plate 11b engages with sealing plate 12d when spinning portion 12 is in the covered position. FIG. 11 and FIG. 12 show elevated views of spinning portion 12 of drinking lid 10. FIG. 13 shows a side view of spinning portion 12 of drinking lid 10, and illustrates distance 13y between the bottom surface of cover plate 12a and the top surface of sealing plate 12d. FIG. 14 shows a bottom view of spinning portion 12 of drinking lid 10, with sealing plate 12d extending slightly beyond cover plate 12a. FIG. 15, FIG. 16, and FIG. 17 show isometric views of spinning portion 12 of drinking lid 10. FIG. 15 and FIG. 17 show spinning portion 12 from a lowered or bottom-up angle. FIG. 16 shows spinning portion 12 from an elevated angle. FIG. 18 and FIG. 19 show isometric views of stationary portion 11 of drinking lid 10. FIG. 18 shows stationary portion 11 and mounting opening 11a, without spinning portion 12, from an elevated angle. FIG. 19 shows stationary portion 11 and mounting opening 11a, without spinning portion 12, from a lowered or bottom-up angle, illustrating opening thickness 13x of drinking opening 13.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed:

1. A drinking lid for a container, the drinking lid having a top side and a bottom side, the drinking lid comprising:
   a stationary portion configured to be removably coupled, via one or more mechanical couplings, to the container, wherein the stationary portion is further configured to remain stationary in relation to the container upon coupling, until uncoupled by a user,
   wherein the stationary portion includes a first opening on the top side of the drinking lid and a second opening on the bottom side of the drinking lid, wherein the first opening has a first shape and a first size, wherein a connective slope extends from the first opening to the second opening to form a drinking opening configured to provide a conduit through the stationary portion, from the bottom side of the drinking lid to the top side of the drinking lid, wherein a seal is disposed around the second opening on the bottom side of the drinking lid, wherein the stationary portion includes a stationary plate, wherein the second opening has a second shape and a second size that are different from the first shape and the first size of the first opening; and
   a spinning portion configured to be rotatably coupled to the stationary portion, wherein rotation of the spinning portion is relative to a rotational axis, wherein the spinning portion is configured to be positioned in at least one of a covered position and an open position, wherein the spinning portion is configured to transition between the covered position and the open position through the rotation, wherein the spinning portion includes:
   a cover plate configured to cover the first opening of the drinking opening responsive to the spinning portion being positioned in the covered position;
   an assembly barrel configured to couple to the cover plate, wherein a longitudinal axis of the assembly barrel coincides with the rotational axis of the spinning portion;
   a sealing plate barrel connector configured to be coupled to the assembly barrel, wherein the sealing plate barrel connector is further configured to be coupled to a sealing plate;
   the sealing plate configured to seal the second opening of the drinking opening responsive to the spinning portion being positioned in the covered position, and wherein the stationary plate is configured to push the sealing plate against the seal around the second opening of the drinking opening responsive to the spinning portion being positioned in the covered position,
   wherein, responsive to the spinning portion being positioned in the open position, the cover plate is configured to leave the first opening uncovered and the sealing plate is configured to leave the second opening uncovered such that the drinking opening provides the conduit through the stationary portion of the drinking lid.

2. The drinking lid of claim 1, wherein the container is a beverage container.

3. The drinking lid of claim 1, wherein the container is a portable blender.

4. The drinking lid of claim 1, wherein the stationary portion includes the one or more mechanical couplings, wherein the one or more mechanical couplings include one or more threaded couplings, enabling the user to manually couple and uncouple the stationary portion from the container.

5. The drinking lid of claim 1, wherein the cover plate has a bottom surface, wherein the sealing plate has a top surface, wherein the drinking opening has an opening thickness between the first opening and the second opening, and wherein the opening thickness corresponds to a distance between the bottom surface of the cover plate and the top surface of the sealing plate.

6. The drinking lid of claim 1, wherein the sealing plate is configured to seal the second opening of the drinking opening such that the drinking lid is spill-resistant.

7. The drinking lid of claim 1, wherein the stationary portion of the drinking lid includes a strap connector configured to connect to a carrying strap.

8. The drinking lid of claim 1, wherein the stationary plate is positioned on the bottom side of the drinking lid, and wherein the stationary plate is positioned below the second opening.

9. A container with a drinking lid, the drinking lid having a top side and a bottom side, wherein the container is configured to contain a beverage, wherein the drinking lid comprises:
   a stationary portion configured to be removably coupled, via one or more mechanical couplings, to the container, wherein the stationary portion is further configured to remain stationary in relation to the container upon coupling, until uncoupled by a user,
   wherein the stationary portion includes a first opening on the top side of the drinking lid and a second opening on the bottom side of the drinking lid, wherein the first opening has a first shape and a first size, wherein a connective slope extends from the first opening to the second opening to form a drinking opening configured to provide a conduit through the stationary portion, from the bottom side of the drinking lid to the top side of the drinking lid, wherein a seal is disposed around the second opening on the bottom side of the drinking lid, wherein the stationary portion includes a stationary plate, wherein the second opening has a second shape and a second size that are different from the first shape and the first size of the first opening; and
   a spinning portion configured to be rotatably coupled to the stationary portion, wherein rotation of the spinning portion is relative to a rotational axis, wherein the spinning portion is configured to be positioned in at least one of a covered position and an open position, wherein the spinning portion is configured to transition between the covered position and the open position through the rotation, wherein the spinning portion includes:
- a cover plate configured to cover the first opening of the drinking opening responsive to the spinning portion being positioned in the covered position;
- an assembly barrel configured to couple to the cover plate, wherein a longitudinal axis of the assembly barrel coincides with the rotational axis of the spinning portion;
- a sealing plate barrel connector configured to be coupled to the assembly barrel, wherein the sealing plate barrel connector is further configured to be coupled to a sealing plate;
- the sealing plate configured to seal the second opening of the drinking opening responsive to the spinning portion being positioned in the covered position, and wherein the stationary plate is configured to push the sealing plate against the seal around the second opening of the drinking opening responsive to the spinning portion being positioned in the covered position,
- wherein, responsive to the spinning portion being positioned in the open position, the cover plate is configured to leave the first opening uncovered and the sealing plate is configured to leave the second opening uncovered such that the drinking opening provides the conduit through the stationary portion of the drinking lid.

10. The container of claim 9, wherein the container is a portable blender.

11. The container of claim 9, wherein the container is a beverage container.

12. The container of claim 9, wherein the cover plate has a bottom surface, wherein the sealing plate has a top surface, wherein the drinking opening has an opening thickness between the first opening and the second opening, and wherein the opening thickness corresponds to a distance between the bottom surface of the cover plate and the top surface of the sealing plate.

13. The container of claim 9, wherein the stationary plate is positioned on the bottom side of the drinking lid, and wherein the stationary plate is positioned below the second opening.

14. A drinking lid for a container, the drinking lid having a top side and a bottom side, the drinking lid comprising:
- a stationary portion configured to be removably coupled, via one or more mechanical couplings, to the container, wherein the stationary portion is further configured to remain stationary in relation to the container upon coupling, until uncoupled by a user,
- wherein the stationary portion includes a first opening on the top side of the drinking lid and a second opening on the bottom side of the drinking lid, and wherein a connective slope extends from the first opening to the second opening to form a drinking opening configured to provide a conduit through the stationary portion, from the bottom side of the drinking lid to the top side of the drinking lid, wherein a seal is disposed around the second opening on the bottom side of the drinking lid, wherein the stationary portion includes a stationary plate; and
- a spinning portion configured to be rotatably coupled to the stationary portion, wherein rotation of the spinning portion is relative to a rotational axis, wherein the spinning portion is configured to be positioned in at least one of a covered position and an open position, wherein the spinning portion is configured to transition between the covered position and the open position through the rotation, wherein the spinning portion includes:
  - a cover plate configured to cover the first opening of the drinking opening responsive to the spinning portion being positioned in the covered position;
  - an assembly barrel configured to couple to the cover plate, wherein a longitudinal axis of the assembly barrel coincides with the rotational axis of the spinning portion;
  - a sealing plate barrel connector configured to be coupled to the assembly barrel, wherein the sealing plate barrel connector is further configured to be coupled to a sealing plate;
  - a cover plate sealing collar disposed between the cover plate and the sealing plate, wherein the cover plate sealing collar is configured to seal the spinning portion to the stationary portion in the covered position, and wherein the cover plate sealing collar is further configured to couple to the assembly barrel;
  - the sealing plate configured to seal the second opening of the drinking opening responsive to the spinning portion being positioned in the covered position, and wherein the stationary plate is configured to push the sealing plate against the seal around the second opening of the drinking opening responsive to the spinning portion being positioned in the covered position,
  - wherein, responsive to the spinning portion being positioned in the open position, the cover plate is configured to leave the first opening uncovered and the sealing plate is configured to leave the second opening uncovered such that the drinking opening provides the conduit through the stationary portion of the drinking lid.

15. A drinking lid for a container, the drinking lid having a top side and a bottom side, the drinking lid comprising:
- a stationary portion configured to be removably coupled, via one or more mechanical couplings, to the container, wherein the stationary portion is further configured to remain stationary in relation to the container upon coupling, until uncoupled by a user,
- wherein the stationary portion includes a first opening on the top side of the drinking lid and a second opening on the bottom side of the drinking lid, and wherein a connective slope extends from the first opening to the second opening to form a drinking opening configured to provide a conduit through the stationary portion, from the bottom side of the drinking lid to the top side of the drinking lid, wherein a seal is disposed around the second opening on the bottom side of the drinking lid, wherein the stationary portion includes a stationary plate; and
- a spinning portion configured to be rotatably coupled to the stationary portion, wherein rotation of the spinning portion is relative to a rotational axis, wherein the spinning portion is configured to be positioned in at least one of a covered position and an open position, wherein the spinning portion is configured to transition between the covered position and the open position through the rotation, wherein the spinning portion includes:
  - a cover plate configured to cover the first opening of the drinking opening responsive to the spinning portion being positioned in the covered position;

an assembly barrel configured to couple to the cover plate, wherein a longitudinal axis of the assembly barrel coincides with the rotational axis of the spinning portion, wherein the assembly barrel has a proximal end at or near the cover plate and a distal end opposite the proximal end, wherein the spinning portion further includes a nut disposed at the distal end of the assembly barrel;

a sealing plate barrel connector configured to be coupled to the assembly barrel, wherein the sealing plate barrel connector is further configured to be coupled to a sealing plate;

the sealing plate configured to seal the second opening of the drinking opening responsive to the spinning portion being positioned in the covered position, and wherein the stationary plate is configured to push the sealing plate against the seal around the second opening of the drinking opening responsive to the spinning portion being positioned in the covered position, wherein, responsive to the spinning portion being positioned in the open position, the cover plate is configured to leave the first opening uncovered and the sealing plate is configured to leave the second opening uncovered such that the drinking opening provides the conduit through the stationary portion of the drinking lid.

\* \* \* \* \*